US011010976B2

(12) United States Patent
Shaviv et al.

(10) Patent No.: US 11,010,976 B2
(45) Date of Patent: May 18, 2021

(54) INTERACTIVE ITEM PLACEMENT SIMULATION

(71) Applicant: Houzz, Inc., Palo Alto, CA (US)

(72) Inventors: Guy Shaviv, Zichron (IL); Xiaoyi Huang, San Mateo, CA (US); Aaron Yip, Menlo Park, CA (US)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 16/416,667

(22) Filed: May 20, 2019

(65) Prior Publication Data

US 2019/0340824 A1 Nov. 7, 2019

Related U.S. Application Data

(63) Continuation of application No. 15/411,673, filed on Jan. 20, 2017, now Pat. No. 10,347,049.

(51) Int. Cl.
| | |
|---|---|
| *G06T 19/00* | (2011.01) |
| *G06T 11/60* | (2006.01) |
| *G06T 19/20* | (2011.01) |
| *G06Q 30/06* | (2012.01) |

(52) U.S. Cl.
CPC ....... *G06T 19/006* (2013.01); *G06Q 30/0643* (2013.01); *G06T 11/60* (2013.01); *G06T 19/20* (2013.01); *G06T 2200/04* (2013.01); *G06T 2200/24* (2013.01); *G06T 2210/04* (2013.01); *G06T 2219/004* (2013.01); *G06T 2219/2016* (2013.01)

(58) Field of Classification Search
CPC ....... G06T 11/60; G06T 19/006; G06T 19/20; G06T 2200/04; G06T 2200/24; G06T 2210/04; G06T 2219/004; G06T 2219/2016; G06Q 30/0643
See application file for complete search history.

(56) References Cited

U.S. PATENT DOCUMENTS

| | | | |
|---|---|---|---|
| 6,130,676 A | 10/2000 | Wise et al. | |
| 10,347,049 B2 | 7/2019 | Shaviv et al. | |
| 2007/0050613 A1* | 3/2007 | Islam | H04L 63/0272 713/150 |
| 2010/0321389 A1* | 12/2010 | Gay | G06T 15/00 345/427 |
| 2012/0249741 A1 | 10/2012 | Maciocci et al. | |
| 2015/0317829 A1 | 11/2015 | Carter et al. | |
| 2016/0203644 A1 | 7/2016 | Kita et al. | |

(Continued)

OTHER PUBLICATIONS

"U.S. Appl. No. 15/411,673, Final Office Action dated Apr. 2, 2018", 16 pgs.

(Continued)

*Primary Examiner* — Ke Xiao
*Assistant Examiner* — Jed-Justin Imperial
(74) *Attorney, Agent, or Firm* — Schwegman Lundberg & Woessner, P.A.

(57) ABSTRACT

An approach for simulating items in an environment, such as a room, is disclosed. A package file can store information including an image of the environment and metadata including an identifier that uniquely identifies a selected image. The package file can be used to regenerate a simulation of the item arranged over the image of the environment. Later changes can be made to the simulation of the item by accessing the metadata.

17 Claims, 13 Drawing Sheets

(56) References Cited

U.S. PATENT DOCUMENTS

| | | |
|---|---|---|
| 2016/0292291 A1* | 10/2016 | Yan ...................... G06F 16/957 |
| 2016/0337630 A1 | 11/2016 | Raghoebardajal et al. |
| 2016/0378887 A1 | 12/2016 | Maldonado |
| 2017/0115488 A1 | 4/2017 | Ambrus et al. |
| 2017/0153787 A1 | 6/2017 | Chowdhary et al. |
| 2018/0108183 A1* | 4/2018 | Schuneman .......... G06F 3/0481 |
| 2018/0109900 A1* | 4/2018 | Lyren ..................... H04S 7/304 |
| 2018/0211444 A1 | 7/2018 | Shaviv et al. |

OTHER PUBLICATIONS

"U.S. Appl. No. 15/411,673, Non Final Office Action dated Feb. 20, 2019". 9 pgs.

"U.S. Appl. No. 15/411,673, Non Final Office Action dated Jun. 14, 2018", 17 pgs.

"U.S. Appl. No. 15/411,673, Non Final Office Action dated Oct. 5, 2017", 14 pgs.

"U.S. Appl. No. 15/411,673, Response filed Jan. 5, 2018 to Non Final Office Action dated Oct. 5, 2017", 15 pgs.

"U.S. Appl. No. 15/411,673, Response filed May 31, 2018 to Final Office Action dated Apr. 2, 2018", 16 pgs.

"U.S. Appl. No. 15./411,673, Response filed Oct. 15, 2018 to Non Final Office Action dated Jun. 14, 2018", 16 pgs.

* cited by examiner

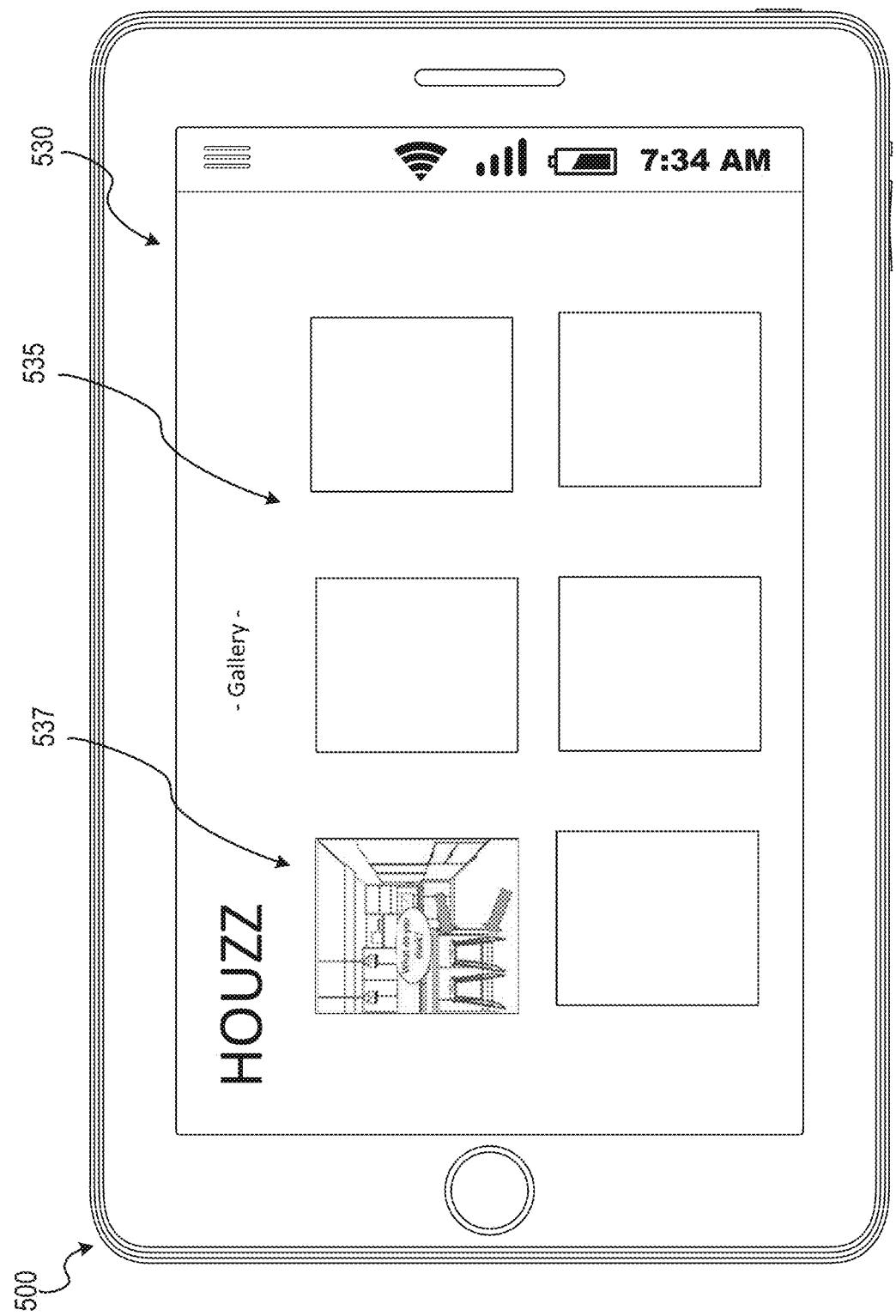

INTERACTIVE ITEM PLACEMENT SIMULATION

PRIORITY APPLICATIONS

This application is a continuation of U.S. patent application Ser. No. 15/411,673, filed. Jan. 20, 2017, the content of which is incorporated herein by reference in its entirety.

TECHNICAL FIELD

Embodiments of the present disclosure relate generally to computer imaging and, more particularly, but not by way of limitation, to simulating items in environments.

BACKGROUND

Increasingly, users are browsing for items, such as couches, chairs, and tables, on Internet websites. Some Internet websites display pictures of the items with descriptions specifying the items' attributes, such as size and color. While Internet websites can be useful for perusing different items, users are forced to make selections without inspecting the items in person. Some users may avoid purchasing items without inspecting the items in person. Thus, the Internet websites may lose traffic as those users opt for brick-and-mortar stores to make their in-person inspection and item selections.

BRIEF DESCRIPTION OF THE DRAWINGS

Various ones of the appended drawings merely illustrate example embodiments of the present disclosure and should not be considered as limiting its scope.

FIGS. 5A-F show example user interfaces for implementing a interactive overlay system and application, according to some example embodiments.

DETAILED DESCRIPTION

Figure 1:
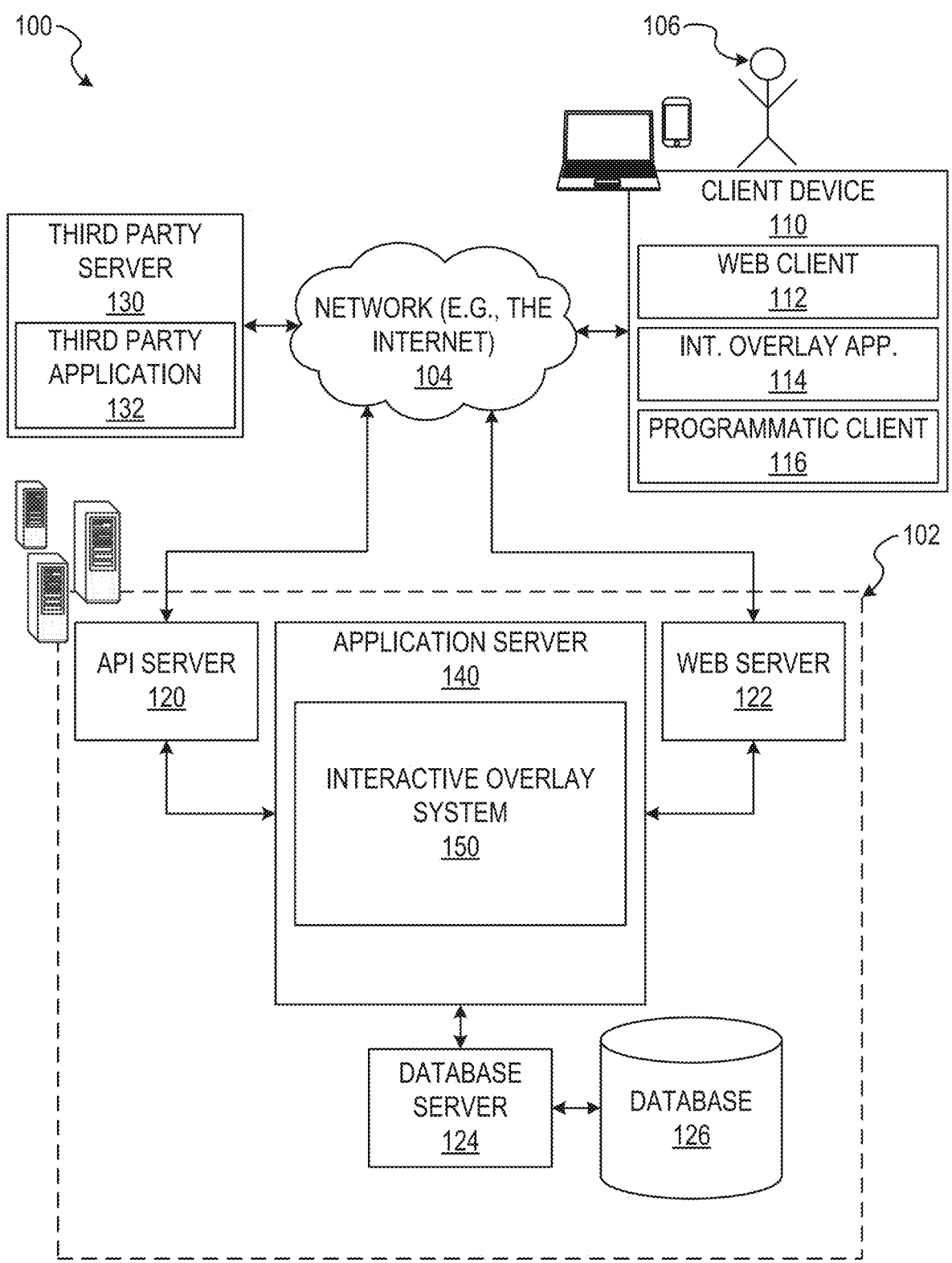
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, digital representations of physical items (e.g., couches, chairs, tables) can be simulated in an environment using a client device, such as a tablet computer. A user can select an item (e.g., a barstool) for simulation in the room in which the user is currently situated. In response to the selection, an interactive overlay application can initiate the camera of the tablet computer to view the room as an image or series of images a live video stream). An image of the selected item can be overlaid on the image of the room. A user can change the size, position, or other attributes about the image of the item. As used below, the term image can refer to a two dimensional (2D) depiction of an item or a three dimensional (3D) model of the item with associated material descriptions and textures. According to some example embodiments, the 3D model of the item allows the user to rotate, and transform the item so that it matches the perspective, angles, and size of the room. Further, according to some example embodiments, the perspective of the room is analyzed and rotations, transformations, and other modifications are made to the 3D model so that the perspective of the 3D automatically matches that of the room.

Once the user is satisfied with the image of the item as arranged in the room, the user can issue a command to save the arrangement. Responsive to the command, a custom package file is generated that saves a frame of the live video stream, camera metadata, and item metadata that describes which item was placed over the live video stream and how it was arranged in front of the live video stream at the point in time the save command was issued. The package file can then be used later to create a composite image that displays the item as arranged in front of the current frame.

In some example embodiments, the custom package file stores both an image of the item and the current frame of the live video stream (e.g., current at the time of issuance of the save command) for later recreation of the arrangement of the item over the live video stream. In some example embodiments, the custom package file stores the current frame of the live video stream and item metadata that describes the item and its relation to the current frame. For example, the item metadata can include a unique item identifier, and information describing the position of the item image. The unique item identifier can be used to retrieve an image of the item when the package file is being used to regenerate the item as arranged over the current frame. In this way, the size of the file package can be reduced so that the composite image can more easily be accessed to add later edits.

With reference to FIG. 1, an example embodiment of a high-level client-server-based network architecture 100 is shown. A networked system 102, in the example forms of a network-based platform, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications such as an interactive overlay application 114, and a programmatic client 116 executing on the client device 110. The client device 110 includes the web client 112, the interactive overlay application 114, and the programmatic client 116 alone, together, or in any suitable combination.

Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, Red/Green/Blue (RGB) channel data, camera, multi-aperture or array camera, 3D camera and processing unit, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area. Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more applications (also referred to as "apps") such as, but not limited to, web browsers, book reader apps (operable to read e-books), media apps (operable to present various media forms including audio and video), fitness apps, biometric monitoring apps, messaging apps, and electronic mail (email) apps. In some implementations, the interactive overlay application 114 include various components operable to present information to the user and communicate with networked system 102.

The web client 112 accesses the various systems of the networked system 102 via the web interface supported by a web server 122. Similarly, the programmatic client 116 or the interactive overlay application 114 are configured to access the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application servers 140. The application server 140 can host an interactive overlay system 150, which can comprise one or more modules or applications, each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by interactive overlay system 150 or client device 110. For example, item image data for images placed using the interactive overlay application 114 can be stored in the database 126 and sent to the client device 110 via the interactive overlay system 150 as described in further detail below. Additionally, a third party application. 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party. Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example.

Figure 2A:
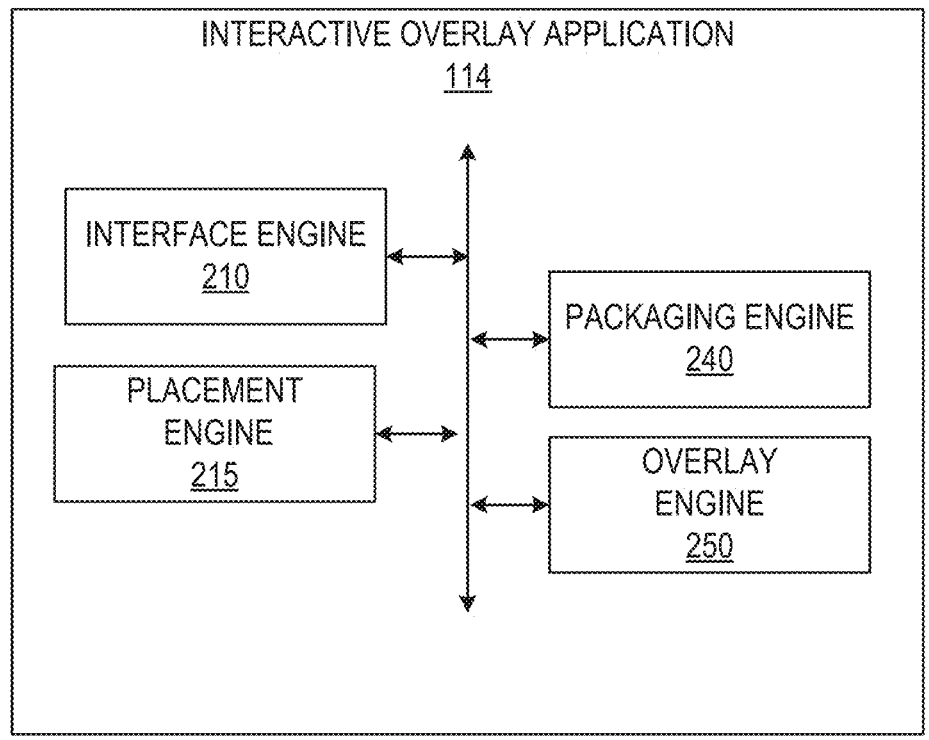
FIG. 2A shows example functional components of an interactive overlay application, according to some example embodiments.

FIG. 2A shows example functional components of an interactive overlay application 114, according to some example embodiments. The components themselves are communicatively coupled (e.g., via appropriate interfaces) to each other and to various data sources, so as to allow information to be passed between the applications or so as to allow the applications to share and access common data. As illustrated, interactive overlay application 114 comprises an interface engine 210, a placement engine 215, a packaging engine 240, and an overlay engine 250. The interface engine 210 manages generating interfaces that display different items (e.g., lamps, chairs, sinks) through a website or local application executed from the client device. The placement engine 215 manages displaying an image of a selected item over a live feed (e.g., live video stream) from an image sensor of the client device 110. The packaging engine 240 is responsible for generating the package file that captures the image of the item as arranged in front of the live feed (e.g., one or more frames of the live feed). The overlay engine 250 is configured to open the package file format and regenerate a display of the item image as arranged in front of the live feed. The display of the item as arranged in front of the live feed a composite image) can then be further manipulated via the overlay engine. For example, the user 106 can annotate the display with text or arrows, or change the size or position of the item. In some example embodiments, when the overlay engine 250 regenerates the display of the item, a digital representation of the item is requested from the interactive overlay system 150 executing on the application server 140.

Figure 2B:
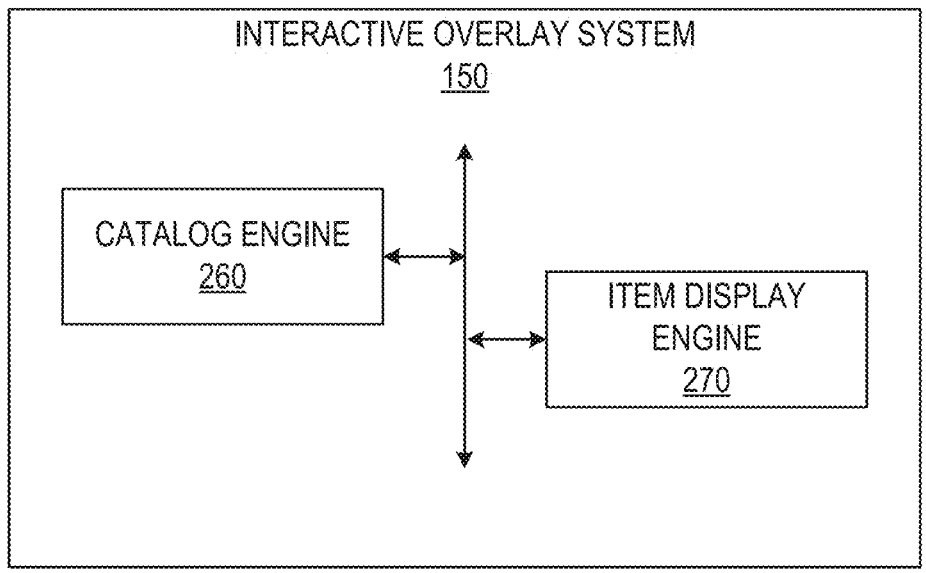
FIG. 2B shows example functional components of an interactive overlay system, according to some example embodiments.

FIG. 2B shows example functional components of an interactive overlay system 150, according to some example embodiments. The components themselves are communicatively coupled (e.g., via appropriate interfaces) to each other and to various data sources, so as to allow information to be passed between the applications or so as to allow the applications to share and access common data. Furthermore, the components access the database 126 via the database server 124. As illustrated, the interactive overlay system 150 comprises a catalog engine 260 and a item display engine 270. The catalog engine 260 is configured to receive requests for an item image from the overlay engine in the interactive overlay application 114. The item can be identified in the request via a unique identifier (e.g., a stock keeping unit (SKU)) that is unique to the item in the network 104. The catalog engine 260 can identify the item using the identifier and transmit the identifier to the item display engine for image generation. The item display engine 270 is configured to generate an item image of the item specified in the request. In some example embodiments, the item image is a 2D image of the item. The item display engine can retrieve the 2D image of the item from the database 126 and transmit it to the overlay engine 250 for further processing (e.g., placement over the one or more frames, resizing of the 2D image). In some example embodiments, the item image is a 3D model of the item. The 3D model of the item can be sent directly to the overlay engine 250 and the overlay engine 250 can arrange the 3D model (e.g., resize, rotate) to overlay it in front of the one or more frames of the room.

Figure 3A:
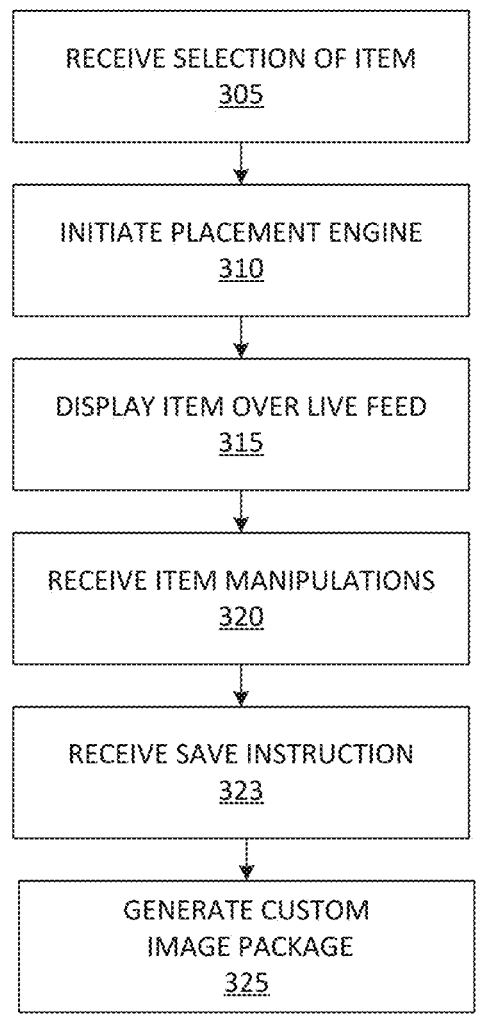
FIG. 3A shows a method for generating a custom image package, according to some example embodiments.

FIG. 3A shows a method 300 for generating a custom image package, according to some example embodiments. At operation 305, the interface engine 210 receives selection of an item. For example, the interface engine may generate a user interface showing several items as different options. The user may select a "View in Room" option for a given item through the user interface. At operation 310, the placement engine 215 is initiated. For example, in response to selecting "View in Room" at operation 305, the placement engine 215 is initiated within the interactive overlay application 114. At operation 315, the placement engine 215 displays the item over a live feed captured from a client device image sensor. For example, the placement engine 215 may initiate a camera on the client device 110 to show a live video feed of a room. A 2D image of the item can be placed as an overlay in front of the live video feed. The live video feed is generated dynamically in that if the client device is rotated, the live feed views a different portion of the room, with the item viewable as an overlay over the different portion of the room.

At operation 320, the placement engine 215 receives item manipulations. For example, the user 106 can reposition the item to a different area of the live feed (e.g., to the left hand side of the live video feed). At operation 323, the placement engine 215 receives a save instruction. At operation 325, responsive to the save instruction, the packaging engine 240 generates a custom image package. The custom image package is a package file containing one or more frames of the room (e.g., frames from the live feed at the point in time the save instruction was received). In some example embodiments, the package file is an individual file with a custom file extension (e.g., "packagefile.hzz") that identifies the individual file as a package file. The package file may further include metadata that specifies where, with respect to the frames, the item was located at the time the save instruction was received. In some example embodiments, the package file includes further metadata such as a unique identifier of the item. The unique identifier can be used to decrease the file size of the package file by requesting the item image using the identifier, instead of saving the item image in the package file. In some example embodiments, the metadata includes other data used to regenerate the composite image, such as camera intrinsic parameters (e.g., Exchangeable Image File Format (EXIF) data), 3D data generated form the camera, gyroscope and other sensor (e.g., accelerometer) data of the client device 110, infrared camera data, video data (e.g., several frames before and after a main frame from the video feed), multi-aperture camera data, and array camera data. According to some example embodiments, the gyroscope and accelerometer data is used to determine the orientation of the floor of the environment. For example, the gyroscope can determine that the client device was tilted 60 degrees form the floor when an image (e.g., current frame) was captured. The 60 degree tilt angle is stored with the metadata and then used to orient the object in the room upon regeneration. The 3D data generated from the camera includes, for example, depth mapping data, that can be used to regenerate a model of the room. In some example embodiments, the model of the room is used in place of the current frame of the room, and the 3D object of the item is placed in the generated 3D room.

According to some example embodiments, the metadata also stores item metadata describing the item or items placed. Item metadata includes one or more of the following: size and location of the item or model stored in relative scale so it can be shown on screens of varying sizes (e.g., smartphone screen, laptop screen, tablet screen), XYZ world space position for 3D placement of the item in the room, XY and depth order for 2D placement of a 2D image of the item in the room, user height data (e.g., the height of the user for use in setting the perspective alignment of the 3D model), field of view data from the camera, scale multiplier or XY bounding box coordinates that specify the size of the item depicted, or rotation data (e.g., Euler or Quaternion rotations) for 3D item models placed in the room. As used above, the item is placed in the room in that it is arranged as an overlay in front of an image of the room captured from the live video feed.

Figure 3B:
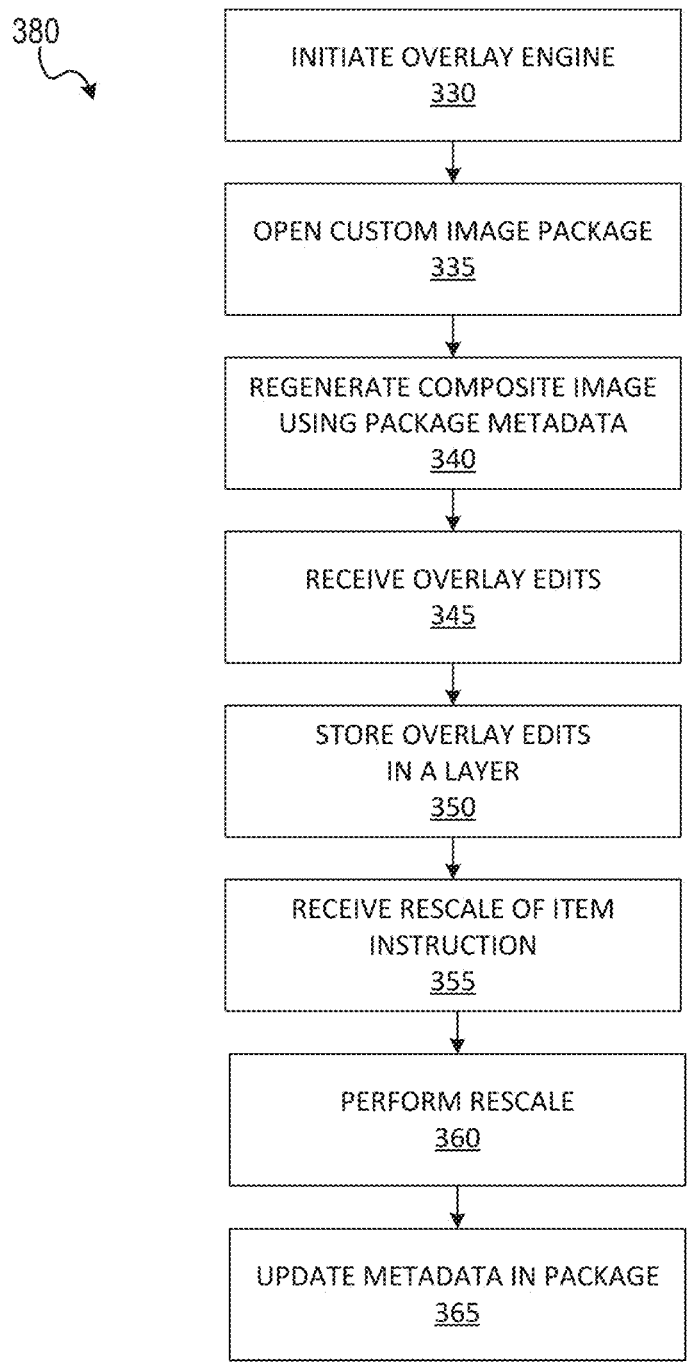
FIG. 3B shows a method for using the custom image package to further interact with the composite image, according to some example embodiments.

FIG. 3B shows a method 380 using the custom image package to further interact with the composite image, according to sonic example embodiments. At operation 330, the overlay engine 250 is initiated. The overlay engine 250 can be initiated in response to an instruction to open the package file. For example, after the package file is generated at operation 325 in FIG. 3A, it can be stored locally or transmitted to other users that have an instance of the interactive overlay application 114 on their client devices. At operation 330, a user attempts to open the package file by selecting it (e.g., selecting a thumbnail of the composite image in an image gallery). Responsive to the selection, the overlay engine 250 can be initiated to handle further processing. In some example embodiments, the overlay engine 250 is initiated in response to identifying the file extension of the package file. For example, the interactive overlay application 114 can be configured as a default application for the file extensions via the operating system of the client device 110.

At operation 335, the overlay engine 250 opens a custom image package generated by the placement engine 215. At operation 340, the overlay engine uses the custom image package to generate a composite image that shows the item arranged over one or more frames of the live feed. The one or more frames include at least the frame currently displayed at the time the save instruction was received. In some example embodiments, the overlay engine 250 identifies the item identifier in the metadata of the package file and transmits a request to the interactive overlay system 150 for image data (e.g., a 2D image) of the item. In some example embodiments, the metadata includes 3D item data, such as where a 3D model of the item was placed over the video stream at time of capture, how the item was rotated, and the size of the item (in relation to frames of the image stream). In those embodiments, the unique identifier and the metadata describing how to arrange (e.g., size, rotate) the item is sent to the item overlay system 150. The item display engine 270 can then identify the item, identify a 3D model of the item, and manipulate (e.g., rotate, resize) the 3D model per the metadata. In some example embodiments, a 2D render of the manipulated 3D model is then sent to the interactive overlay application for positioning over frames from the live video feed. In this way, image data for the item (e.g., high resolution item image data, 3D model data) need not be stored in the package file, thereby making manipulation of the composite image faster and less computationally expensive.

At operation 345, the overlay engine 250 receives edits to the composite image. The edits can include annotating the composite image with text, for example. At operation 350, the overlay engine 250 stores the overlay edits in one or more layers. For example, the annotations including text, arrows, or other shapes can be saved in image layers, and depth order data (e.g., ordering of layers) can be stored as package metadata.

At operation 355, the overlay engine 250 receives an instruction to rescale the size of the item depicted in the composite image. For example, the user can manipulate the touchscreen display of client device 110 to increase or decrease the size of the item. At operation 360, the overlay engine 250 performs the rescale edits per the instruction received. At operation 365, the overlay engine 250 updates the metadata in the custom image package to capture the rescale changes to the item.

Figure 4:
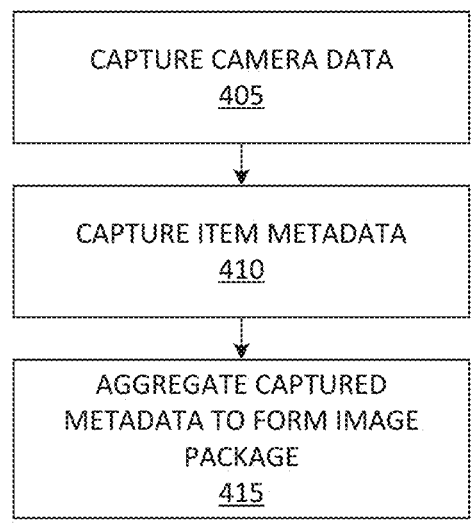
FIG. 4 shows a method for generating an image package, according to some example embodiments.

FIG. 4 shows a method 400 for generating an image package, according to some example embodiments. The operations of the method 400 (operations 405 through 415) can be performed as subroutines to complete operation 325 in FIG. 3B. At operation 405, the packaging engine 240 captures camera data. For example, at operation 405, the user 106 selects a save button. At the time the save button is selected, the packaging engine 240 captures the frame currently being displayed on the screen of the client device. The current frame is the frame saved as camera data at operation 405.

At operation 410, the packaging engine 240 captures item metadata. For example, the live video stream serves as a background for an overlaid image of the item (e.g., a chair). At operation 410, the packaging engine 240 saves the metadata describing the item, such as the unique identifier for the item, the position of the item, size of the item, or the other metadata discussed above. At operation 415, the packaging engine 240 aggregates the captured metadata to form the custom image package. According to some example embodiments, the packaging engine 240 can aggregates the captured metadata a current frame, and metadata describing the item) into an individual file that is identifiable with a custom extension (e.g., ".hzz").

Figure 5A:
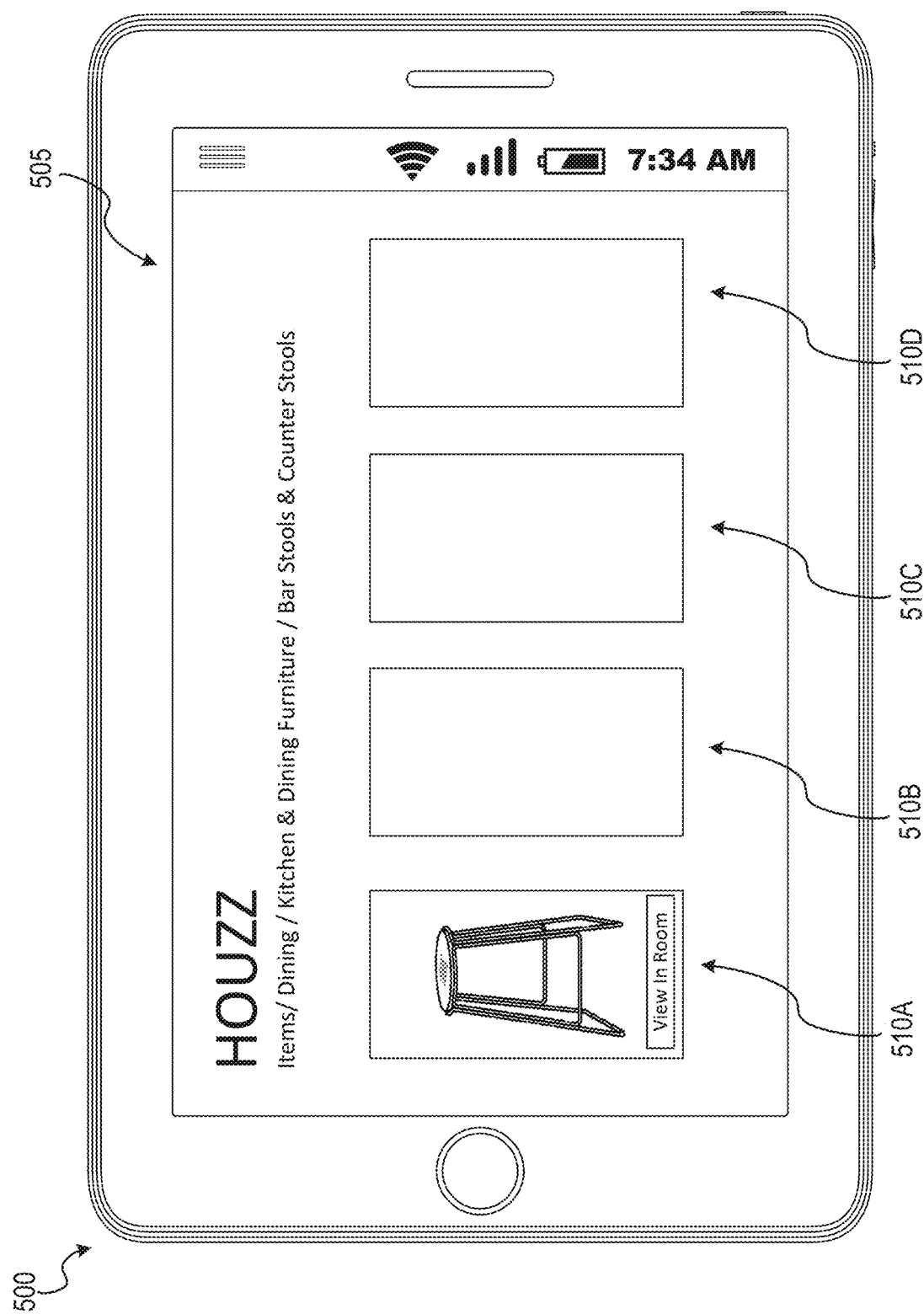

FIG. 5A shows an example client device 500 implemented for using custom image packages, according to some example embodiments. As illustrated in the example, client device 500 is a tablet computer, though one of ordinary skill in the art appreciates that the example client device may be a laptop computer or desktop computer or other computational system, according to various example embodiments. The client device 500 is displaying in an interface 505. In some example embodiments, the interface 505 is an interface of a website that the client device 500 has navigated to via an Internet browser. In some example embodiments, the interface 505 is an interface of a local application installed on the client device 500. Upon the interface 505 being initiated, calls may be made to a server (e.g., Application Server 140) requesting item data to display within item listings. As illustrated, various item listings 510A-D show a variety of items as options for the user to view peruse. In particular, for example, item listing 510A displays a barstool and an option (e.g., linked display element, hyperlink) to "View in Room," A user can select the option if he/she desires to view the barstool simulated in the local environment of the user.

Figure 5B:
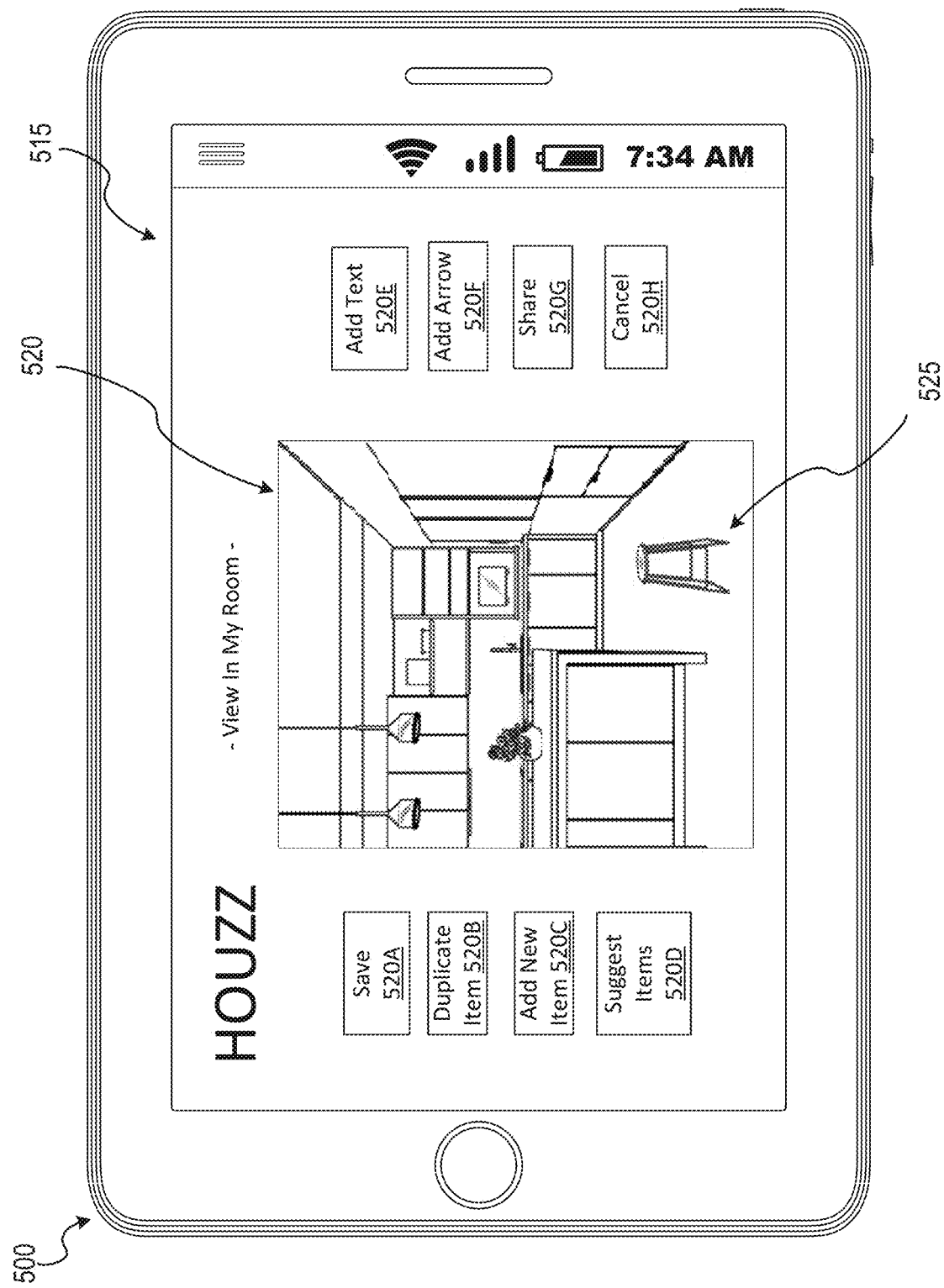

FIG. 5B is an example placement interface 515 generated in response to the user selecting the "View in Room" option of item listing 510A, according to some example embodiments. As illustrated, the placement interface 515 shows a live video feed 520 of the user's local environment, which is a kitchen. The live video feed 520 is captured from a image sensor (e.g., complementary metal-oxide-semiconductor (CMOS) sensor, charge-coupled device (CCD) sensor) on the backside of the client device 500. The user can move the client device 500 to view different parts of his/her local environment through the live video feed (e.g., different parts of the kitchen, different rooms). A 2D depiction of the barstool 525 is shown as an overlay on the live video feed 520. In this way, the user can view how the barstool may look in the user's local environment.

The placement interface 515 further includes various options (e.g., buttons 520A-H) for interacting with the placement interface 515. Button 520A generates an instruction to save the barstool as arranged on top of the live video feed. Button 520B generates an instruction to duplicate the item (e.g., duplicate the barstool 525). Button 520C generates an instruction to add new items, such as items from item listings 510B-D. Button 520D generates an instruction to suggest items similar to the barstool, according to some example embodiments. Further, in some example embodiments, button 520D generates an instruction to suggest items that are similar to the attributes of the local environment (e.g., color, style, motif) as captured by the live video feed. Button 520E generates an instruction to overlay text on the live video feed 520. Button 520E generates an instruction to overlay an arrow on live video feed 520. Button 520G generates an instruction to share the arrangement. For example, button 520G generates an instruction to share the item 525 as arranged over the live video feed 520 on social media websites or send the item 525 as arranged over the live video feed 520 to another user via a communication channel of the client device (e.g., short message server (SMS) messaging). Button 52011 generates an instruction to cancel "View in Room" option, which removes the placement interface 515 from display and returns the user back to the interface 505, according to some example embodiments.

Figure 5C:
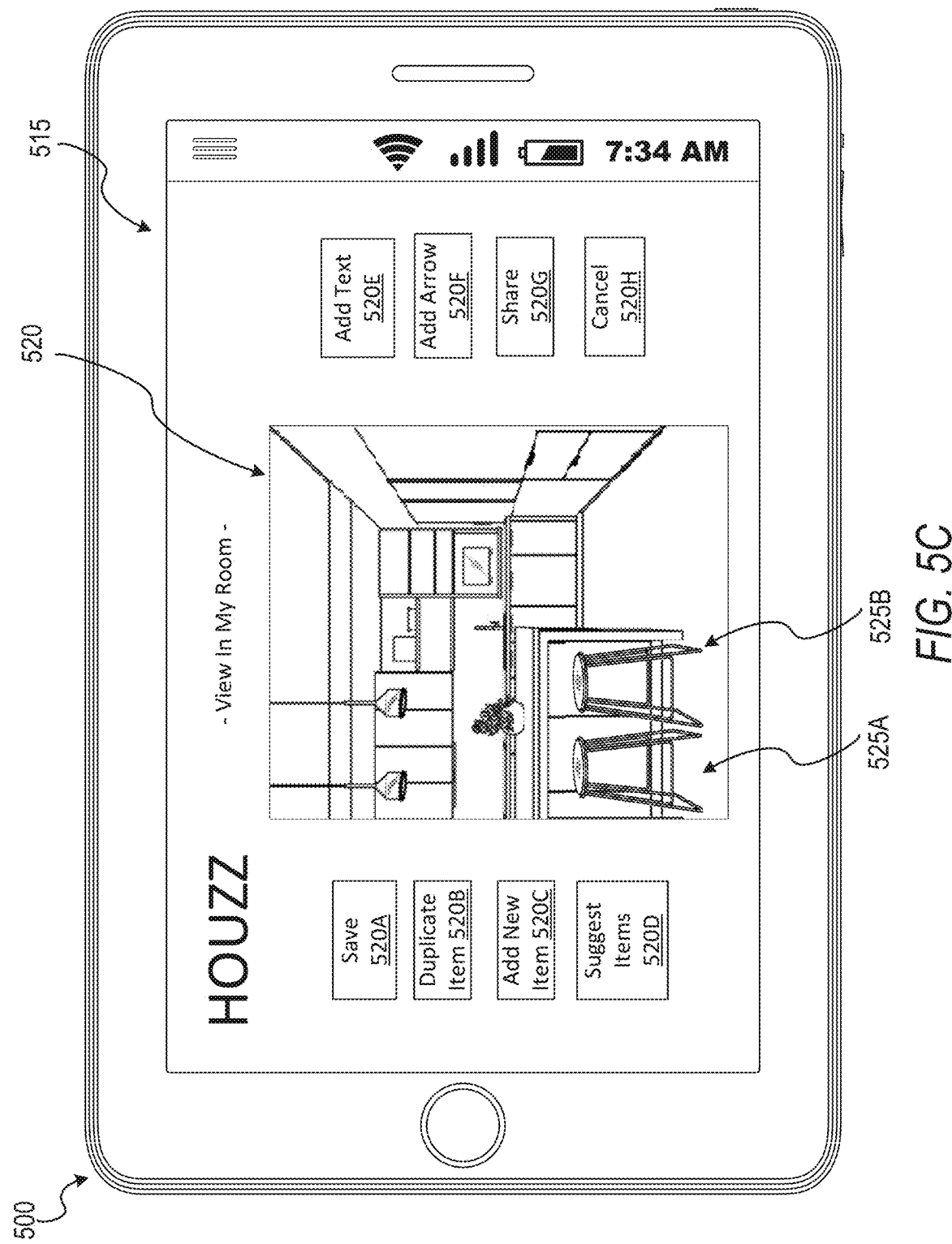

The placement interface 515 further provides the ability to manipulate the item 525 directly. For example, the user can use the touchscreen of client device 500 to use two fingers to pinch-and-move out or in over the item 525 to rescale the item, making it larger or smaller, respectively. FIG. 5C shows an example of the placement interface 515, in which the user has resealed the item 525 to make it larger, and used button 520B to duplicate the enlarged item, thereby making two items 525A and 525B. Further, the user has moved the two items to a region in the live video feed so that the barstools appear to be near a countertop of the kitchen.

Figure 5D:
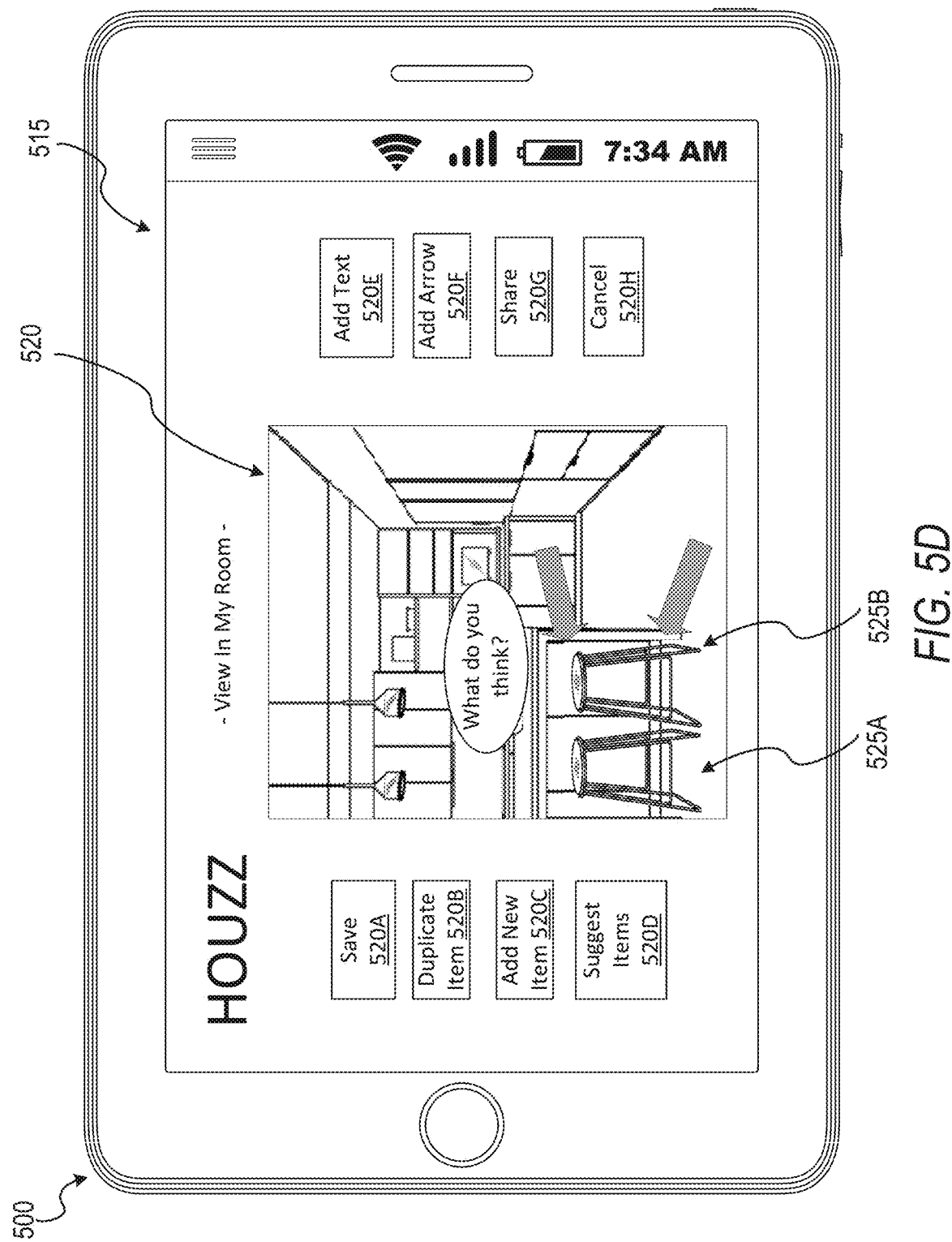

FIG. 5D shows an example in which the user has used the placement interface 515 to add other items over the live video feed 520, according to some example embodiments. For example, the user has used button 520E to add a text bubble with the text "What do you think?" near items 525A and 525B. Further, the user has used button 520F twice to add two arrows pointing at items 525A and 525B. In some example embodiments, the current frame is saved in a first, bottom-most layer, the items 525A and 525B are saved in a second layer in front of the first player, the text annotation is saved in a third layer, and the arrows are saved in a fourth later. The depth order of the layers can be saved as item metadata in the package file.

After the user is satisfied with the changes made, the user selects button 520A which generates instruction to capture the arrangement of the items 525A and 525B, the text bubble, and the arrows over an image frame from the live video feed 520. As discussed above, the arrangement can be captured in a custom file package which is stored locally on the client device 500 or stored on the application server 140.

FIG. 5E shows an example gallery interface 530, according to some example embodiments. The gallery interface 530 displays a plurality of thumbnails 535 for saved package files. For example, thumbnail 537 corresponds to the package file generated from the arrangement shown in FIG. 5D. In some example embodiments, users can grant each other access to the saved package files through granting access to the gallery. Assuming the user would like to further change the composite image, the user can use the touchscreen of client device 500 to select thumbnail 537, which initiates the overlay engine 250 to regenerate the composite image as described above. That is, for example, the overlay engine 250 identifies the current frame and identifies the unique item identifier. The unique item identifier is then used to request the image data from the application server 140. Once item image data is retrieved, the overlay engine 250 can then arrange it over the current frame per the metadata specifications.

Figure 5F:
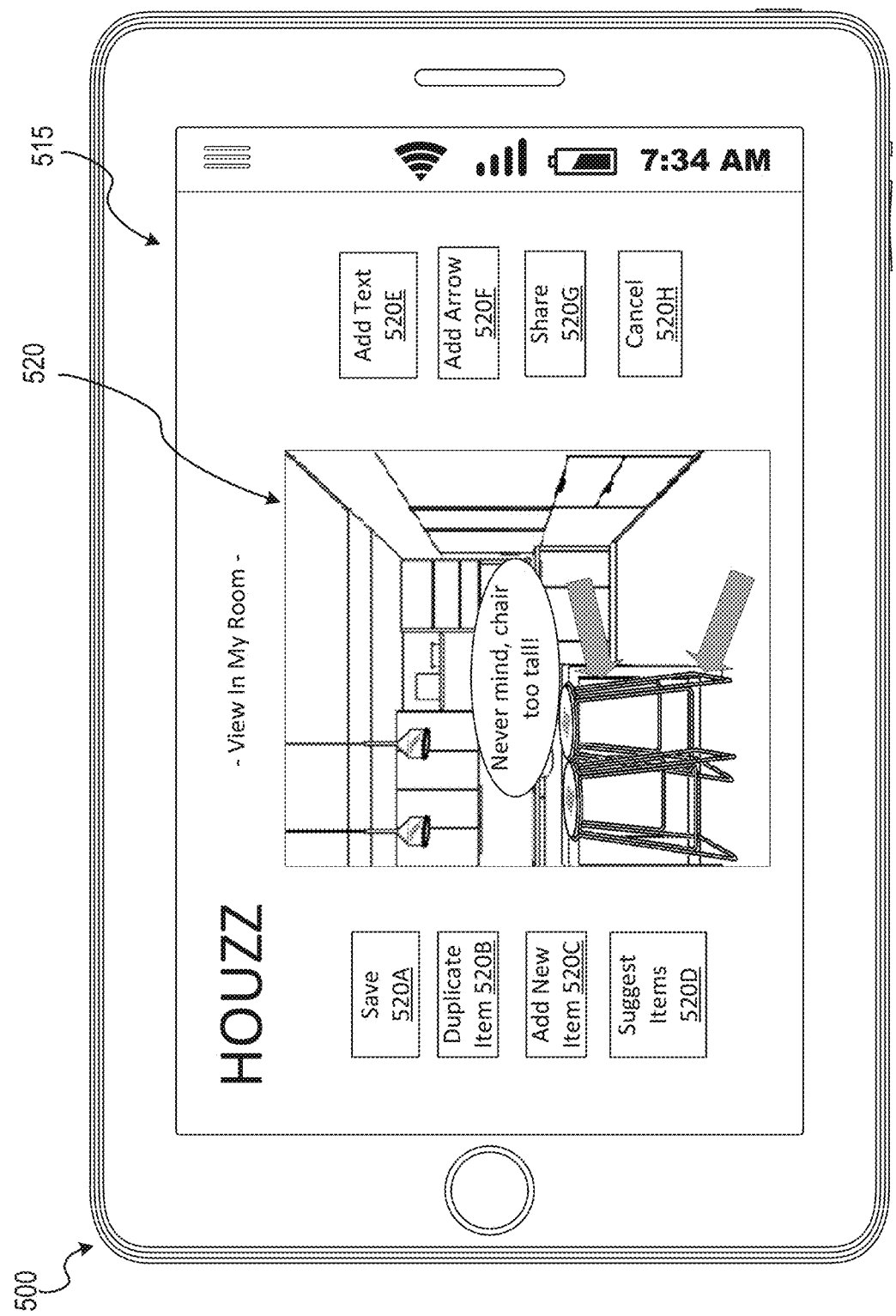

FIG. 5F illustrates a placement interface 515 being used to further interact with the composite image, according to some example embodiments. The composite image can be edited to make further updates to more accurately simulate the items in front of the current frame (e.g., captured frame). For example, assume the user has measured the height of the countertop in his or kitchen and compared the height of the countertop to the height of the item 525. From the comparison, the user has realized that the arrangement shown in FIG. 5D is inaccurate because the barstools, if actually placed in the kitchen, would be much taller than depicted. To initiated the correction process, the user has selected the thumbnail 537 (in FIG. 5E), which has relaunched the placement interface 515 and caused the overlay engine 250 to regenerate the composite image showing the arrangement as shown in FIG. 5F.

To correct the inaccuracy, the user can the pinch-and-move-in gesture on the two chairs to make them correspond to their real height relative to the kitchen countertop. As shown in the arrangement of FIG. 5F, the chairs are now clearly too tall for the kitchen countertop as a person sitting in the chair would not be able to tuck his/her legs under the countertop. To further capture the newly realized information of the chairs being too tall, the user can modify the text bubble to say "Never mind, chair too tall!". Upon the necessary changes being made, the user can select the button 520A to cause the metadata to be updated.

Example structure source code is disclosed below. The structure source code is an example implementation of the methods shown in FIGS. 3A, 3B, and 4, according to some example embodiments. The operations of the methods shown in FIGS. 3A, 3B, and 4 are labeled below. Comment code is indicated by the user of two forward slashes. The comment code describes the operations performed at the respective comment code locations. One of ordinary skill in the art appreciates that although the structure source code may resemble a certain programming language, other programming languages can implement the structure source code below.

```
::::::::::BEGIN CODE::::::::::
//interactive_overlay_structure_code
image_overlayer.c
//RECEIVE SELECTION OF ITEM
void Operarion305( )
{
    item = selected_item
};
//INITIATE PLACEMENT ENGINE
Operation310(item);
{
    //load placement engine class
};
//DISPLAY ITEM OVER FEED
Operation315(item);
{
    //initiate live video feed
    //display item over live video feed
};
//RECEIVE ITEM MANIPULATIONS
void Operation320(item, manipulations);
{
    //apply manipulations to item
};
//GENERATE CUSTOM IMAGE PACKAGE
void Operation325( );
{
    //CAPTURE CAMERA METADATA
    void Operation405( );
        {
        frame = current frame of live video feed
        };
//CAPTURE ITEM METADATA
    void Operation410( );
        {
        item identifier = 123456789
        item vertical position = 50 pixels from bottom border of frame
        item horizontal position = 50 pixels from right border of frame
        };
    //AGGREGATE CAPTURED METADATA TO FORM IMAGE PACKAGE
    Operation415(frame, item identifier, item vertical position, item horizontal position);
        {
        //generate package_file.hzz
        };
};
//INITIATE IMAGE EDITOR
void Operation330( );
{
//load overlay engine class
};
//OPEN CUSTOM IMAGE PACKAGE
Operation335(package_file.hzz);
{
};
//REGENERATE COMPOSITE IMAGE USING PACKAGE METADATA
Operation340(package_file.hzz);
{
//API call to server requesting image_data for identifier 123456789
//generate composite image using frame, image data and item metadata
};
//RECEIVE OVERLAY EDITS
Operation345(edits);
{
};
//STORE OVERLAY EDITS IN A LAYER
Operation350(edits);
{
//apply edits to objects displayed
};
//RECEIVE RESCALE OF ITEM INSTRUCTION
Operation355(recd_item_rescale);
{
rescale = recd_item_rescale
};
//PERFORM RESCALE
```

-continued

```
Operation360(rescale, item_image);
{
//apply edits to objects displayed
};
//UPDATE METADATA IN PACKAGE
void Operation325( );
{
//store edits to package_file.hzz
};
  :::::::::END CODE:::::::::
```

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-5F are implemented in some embodiments in the context of a machine and an associated software architecture. The sections below describe representative software architecture and machine (e.g., hardware) architecture that are suitable for use with the disclosed embodiments.

Figure 6:
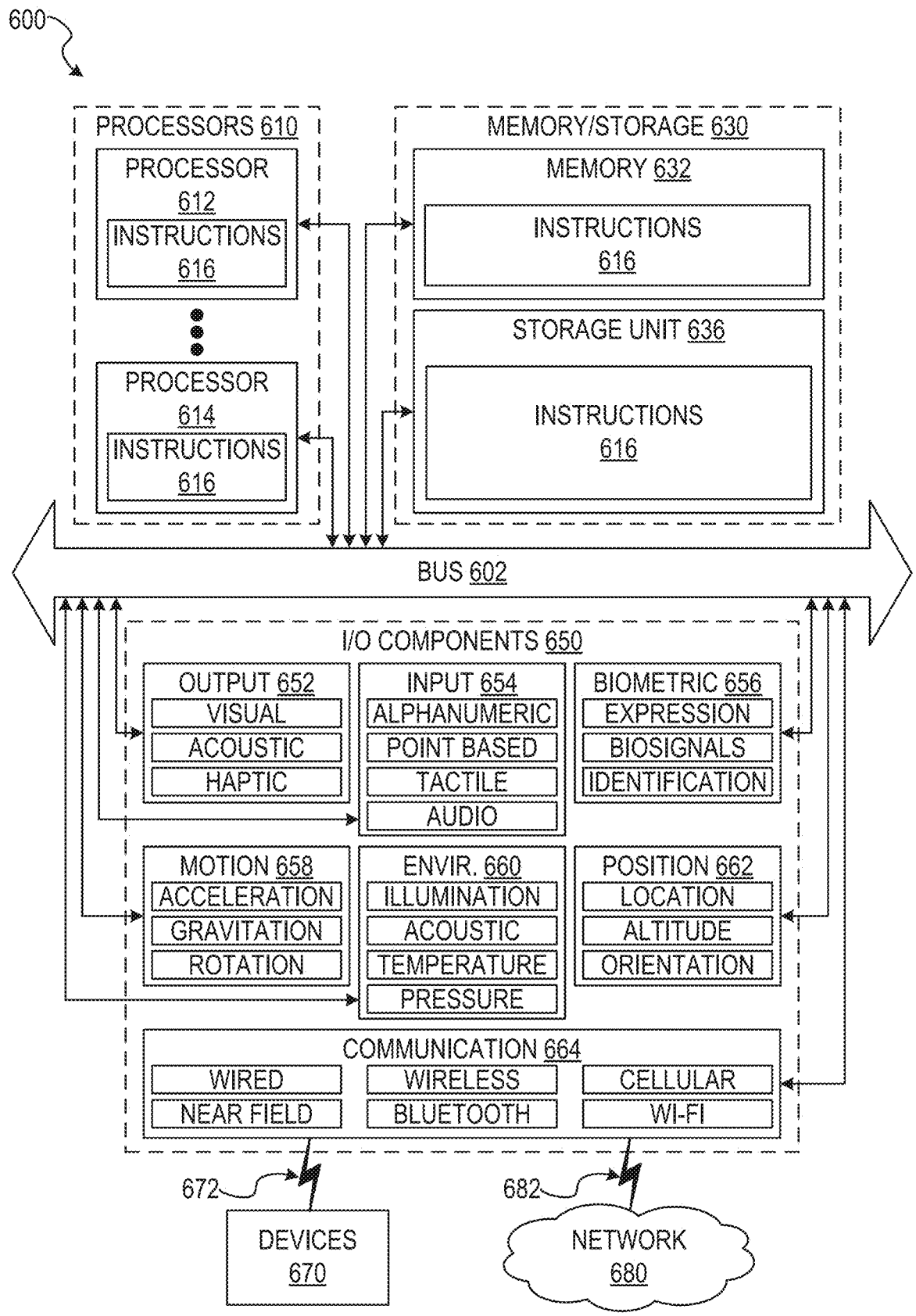
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 software, a program, an application, an applet, an app, or other executable code) for causing the machine 600 to perform any one or more of the methodologies discussed herein can be executed. For example, the instructions 616 can cause the machine 600 to execute the flow diagrams of FIGS. 3A, 3B, and 4. Additionally, or alternatively, the instruction 616 can implement an interface engine 210, a placement engine 215, a packaging engine 240, and an overlay engine 250 module of FIG. 2A, as well as the catalog engine 260 and the item display engine 270 of FIG. 2B, and so forth. The instructions 616 transform the general, non-programmed machine into a particular machine programmed to carry out the described and illustrated functions in the manner described. In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and Input/Output (I/O) components 650, which can be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, processor 612 and processor 614 that may execute instructions 616. The term "processor" is intended to include multi-core processor that may comprise two or more independent processors (sometimes referred to as "cores") that can execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 650 can include biometric components 656, motion components 658, environmental components 660, or position components 662 among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., an accelerometer), gravitation sensor components, rotation sensor components (e.g., a gyroscope), and so forth in some example embodiments, the I/O components include 3D camera module components that can be used to analyze the environment. For example, according to some example embodiments, the 3D module components are configured to perform depth mapping analysis of the room by using a plurality of lens to analyze discrepancies in light data from different lenses of a multi-lensed or multi-aperture camera.

The environmental components 660 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or other suitable device to interface with the network 680. In further examples, communication components 664 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a Universal Serial Bus (USB)).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or other type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 can be transmitted or received over the network 680 using a transmission medium via a network interface device a network interface component included in the communication components 664) and utilizing any one of a number of well-known transfer protocols (e.g., Hypertext Transfer Protocol (HTTP)). Similarly, the instructions 616 can be transmitted or received using a transmission medium via the coupling 672 (e.g., a peer-to-peer coupling) to devices 670. The term "transmission medium" shall be taken to include any intangible medium that is capable of storing, encoding, or carrying the instructions 616 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, over a network, a virtual modeless package file generated by a first client device for rendering, on a second client device, of a selected virtual model on an image generated by the first client device, the virtual modeless package file generated on the first client device by saving, in the virtual modeless package file, a virtual model identifier that identifies the virtual model on a network site and saving one or more arrangements to the virtual model as rendered on the first client device over the image generated by an image sensor of the first client device, the one or more arrangements including a change of perspective from an initial perspective to a new perspective in relation to boundaries of the image that is generated by the first client device, the virtual modeless package file received over the network by the second client device;
   requesting, by the second client device, a request for virtual model data of the virtual model using the virtual model identifier in the virtual modeless package file generated by the first client device for playback on the second client device; and
   displaying, on a touchscreen of the second client device, a composite image that displays the image and the virtual model data of the virtual model as rendered, by the second client device, in the new perspective in relation to the boundaries of the image according to the one or more arrangements included in the virtual modeless package file by the first client device.

2. The method of claim 1, wherein the one or more arrangements includes rotation data describing the new perspective of the virtual model in relation to the image.

3. The method of claim 1, further comprising:
   receiving one or more scale adjustments to the virtual model in the composite image; and
   including the one or more scale adjustments in the one or more arrangements of the virtual modeless package file.

4. The method of claim 1, wherein the virtual model is a three-dimensional model.

5. The method of claim 1, wherein the virtual model data is implemented by the second client device to generate a render according to the virtual modeless package file.

6. The method of claim 1, wherein the virtual modeless package file includes the virtual model identifier and the one or more arrangements for displaying the virtual model on the second client device, and wherein the virtual modeless package file does not include the virtual model data for rendering the virtual model on the second client device.

7. A client device comprising:
   one or more processors of a machine;
   a memory storing instructions that, when executed by the one or more processors, cause the machine to perform operations comprising:
   receiving, over a network, a virtual modeless package file generated by another client device for rendering, on the client device, of a selected virtual model on an image generated by the another client device, the virtual modeless package file generated on the another client device by saving, in the virtual modeless package file, a virtual model identifier that identifies the virtual model on a network site and saving one or more arrangements to the virtual model as rendered on the another client device over the image generated by an image sensor of the another client device, the one or more arrangements including a change of perspective from an initial perspective to a new perspective in relation to boundaries of the image that is generated by the another client device, the virtual modeless package file received over the network by the client device:
   requesting, by the client device, a request for virtual model data of the virtual model using the virtual model identifier in the virtual modeless package file generated by the another client device for playback on the client device; and
   displaying, on a touchscreen of the client device, a composite image that displays the image and the virtual model data of the virtual model as rendered, by the client device, in the new perspective in relation to the boundaries of the image according to the one or more arrangements included in the virtual modeless package file by the another client device.

8. The system client device of claim 7, wherein the one or more arrangements includes rotation data describing the new perspective of the virtual model in relation to the image.

9. The client device of claim 7, the operations further comprising:
   receiving one or more scale adjustments to the virtual model in the composite image; and
   including the one or more scale adjustments in the one or more arrangements of the virtual modeless package file.

10. The client device of claim 7, wherein the virtual model is a three-dimensional model.

11. The client device of claim 7, wherein the virtual model data is implemented by the client device to generate a render according to the virtual modeless package file.

12. The system client device of claim 7, wherein the virtual modeless package file includes the virtual model identifier and the one or more arrangements for displaying the virtual model on the client device, and wherein the virtual modeless package file does not include the virtual model data for rendering the virtual model on the another client device.

13. A machine-readable storage medium embodying instructions that, when executed by a client device, cause the client device to perform operations comprising:

receiving, over a network, a virtual modeless package file generated by another client device for rendering, on the client device, of a selected virtual model on an image generated by the another client device, the virtual modeless package file generated on the another client device by saving, in the virtual modeless package file, a virtual model identifier that identifies the virtual model on a network site and saving one or more arrangements to the virtual model as rendered on the another client device over the image generated by an image sensor of the another client device, the one or more arrangements including a change of perspective from an initial perspective to a new perspective in relation to boundaries of the image that is generated by the another client device, the virtual modeless package file received over the network by the client device;

requesting, by the client device, a request for virtual model data of the virtual model using the virtual model identifier in the virtual modeless package file generated by the another client device for playback on the client device; and displaying, on a touchscreen of the client device, a composite image that displays the image and the virtual model data of the virtual model as rendered, by the client device, in the new perspective in relation to the boundaries of the image according to the one or more arrangements included in the virtual modeless package file by the another client device.

14. The machine-readable storage medium of claim 13, wherein the one or more arrangements includes rotation data describing the new perspective of the virtual model in relation to the image.

15. The machine-readable storage medium of claim 13, the operations further comprising:

receiving one or more scale adjustments to the virtual model in the composite image; and including the one or more scale adjustments in the one or more arrangements of the virtual modeless package file.

16. The machine-readable storage medium of claim 13, wherein the virtual model is a three-dimensional model.

17. The machine-readable storage medium of claim 13, wherein the virtual modeless package file includes the virtual model identifier and the one or more arrangements for displaying the virtual model on the client device, and wherein the virtual modeless package file does not include the virtual model data for rendering the virtual model on the another client device.

* * * * *